UNITED STATES PATENT OFFICE.

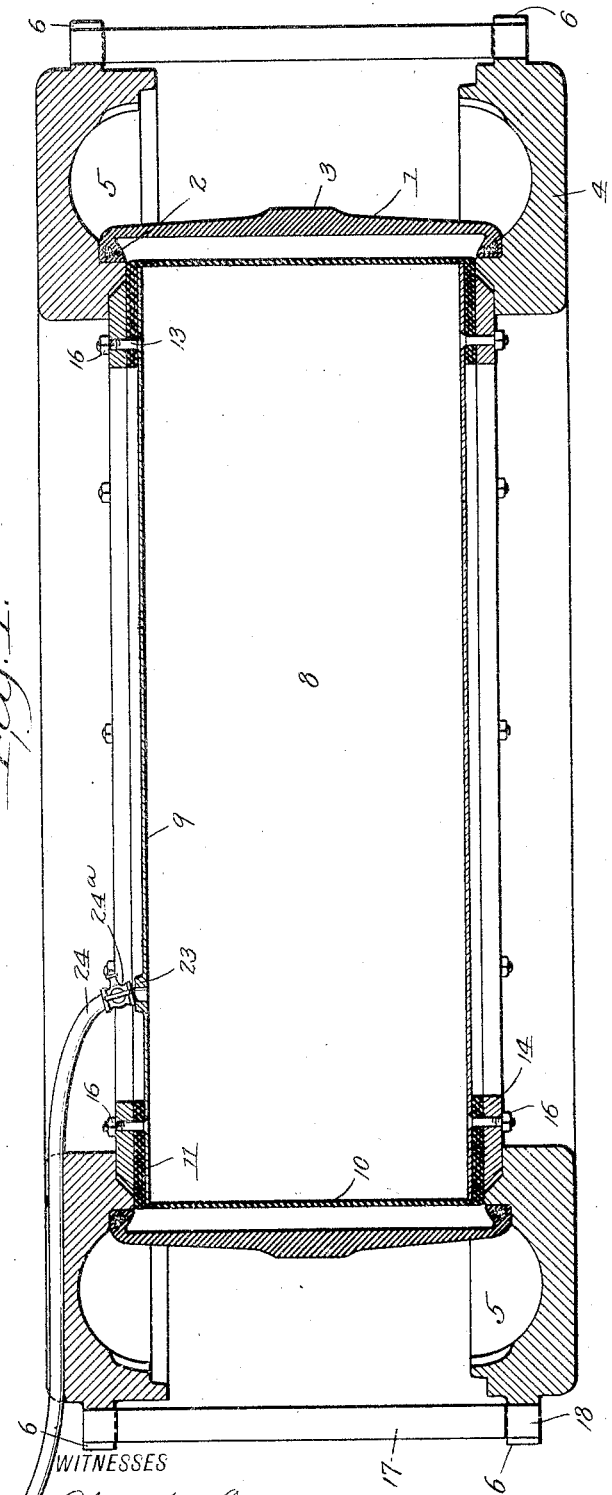
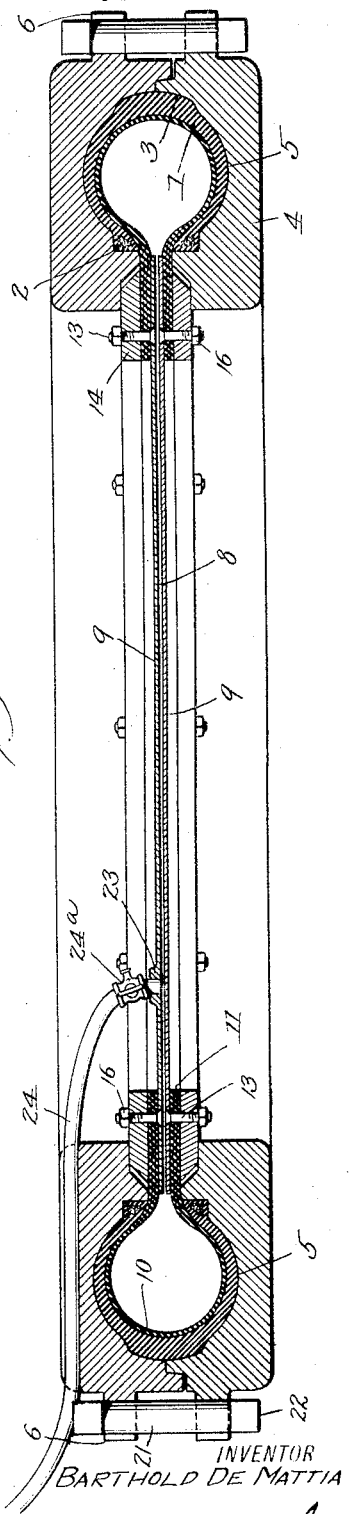

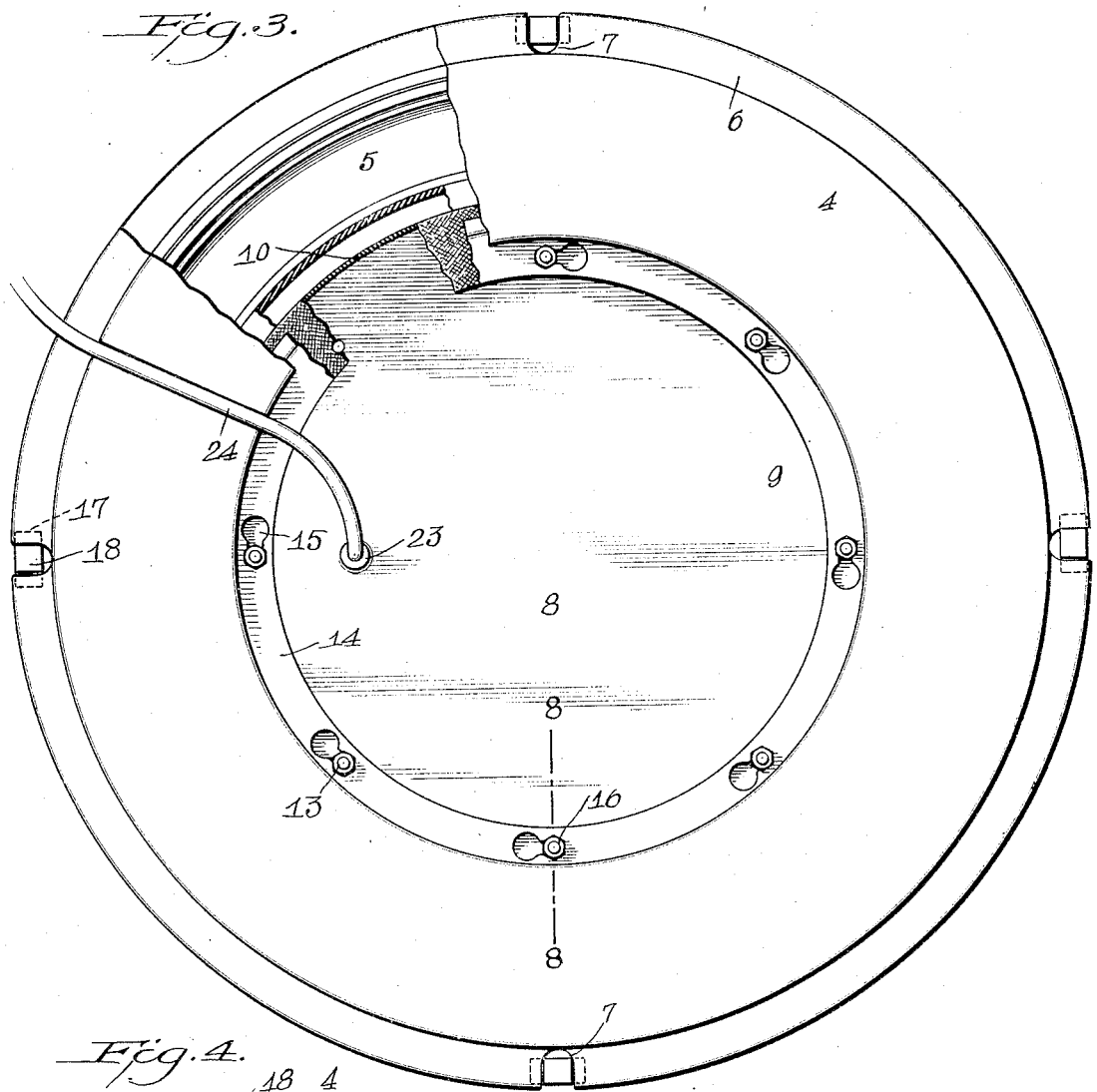
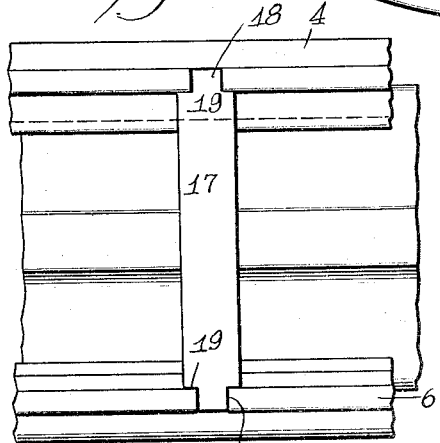
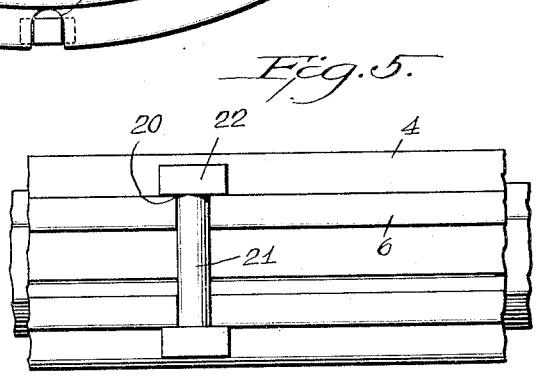

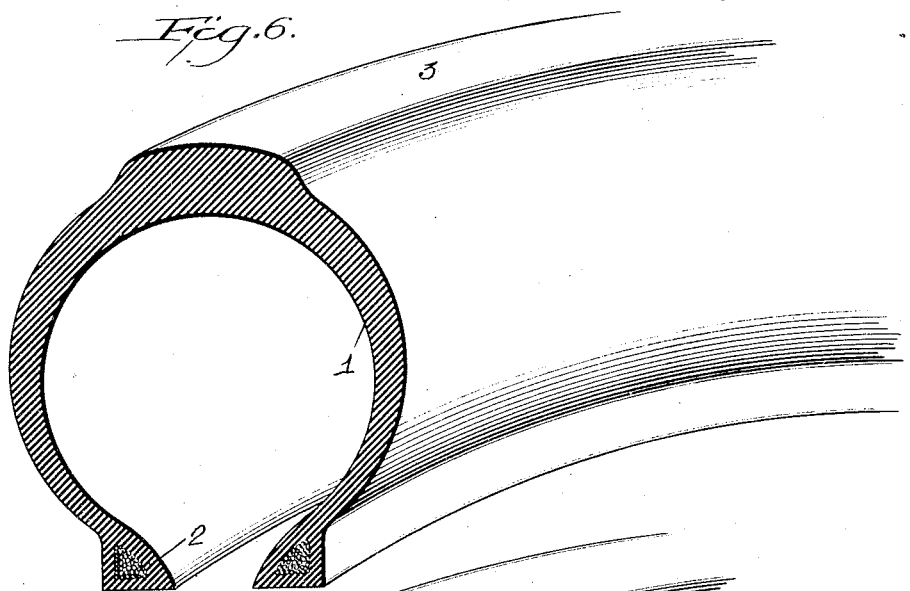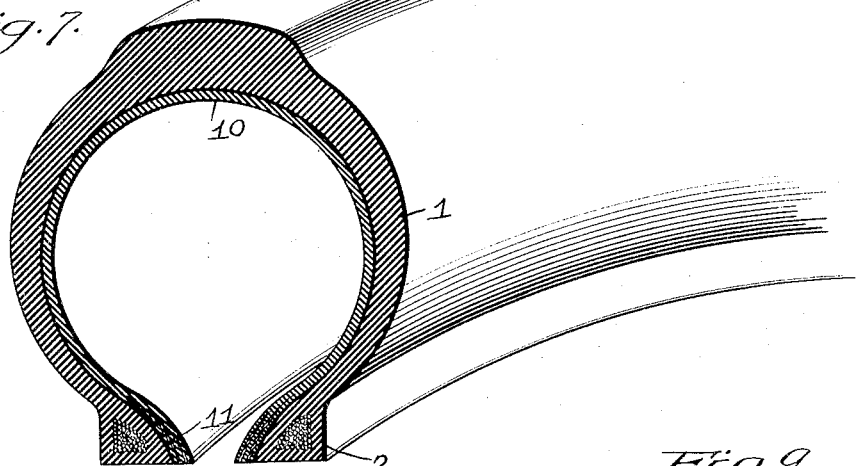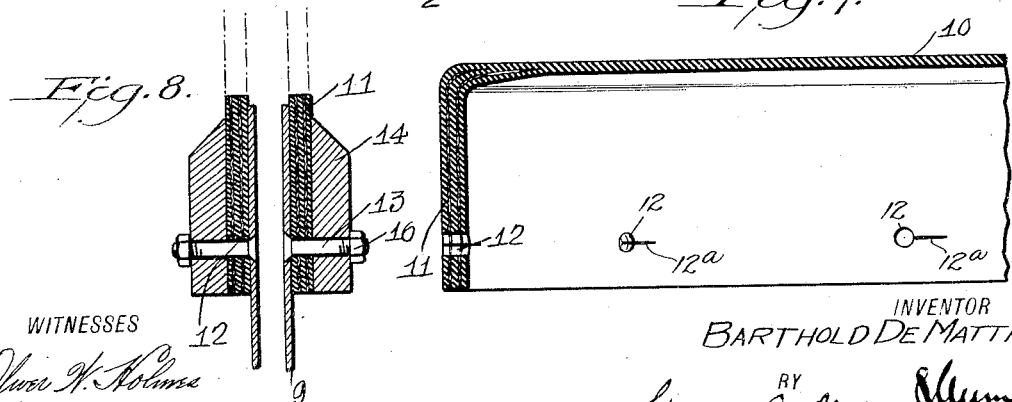

BARTHOLD DE MATTIA, OF CLIFTON, NEW JERSEY.

APPARATUS FOR AND PROCESS OF MAKING PNEUMATIC TIRES.

1,389,442.    Specification of Letters Patent.    Patented Aug. 30, 1921.

Application filed September 17, 1920. Serial No. 410,920.

*To all whom it may concern:*

Be it known that I, BARTHOLD DE MATTIA, a citizen of the United States, and a resident of Clifton, in the county of Passaic and State of New Jersey, have invented certain new and useful Improvements in Apparatus for and Processes of Making Pneumatic Tires, of which the following is a full, clear, and complete description.

The present invention relates to the manufacture of pneumatic tires and more particularly to certain apparatus for, and the process of, manufacturing pneumatic tires from previously formed cylindrical tire blanks, such as are produced by the machinery and processes set forth in my pending applications, Serial Nos. 356,209, filed February 4, 1920; 356,210, filed February 4, 1920; 364,534, filed March 9, 1920; and 364,533, filed March 9, 1920.

In the foregoing applications I have described certain apparatus by the use of which cylindrical tire blanks are produced, such tire blanks embodying at their opposite edges the required bead construction, and also having a centrally disposed, thickened, annular tread, and also apparatus for and a process whereby these cylindrical blanks are simultaneously expanded and compressed and shaped into the desired cross-sectional form of a tire, after which they are properly vulcanized.

The object of the present invention is to provide a simple form of apparatus and process, whereby the cylindrical tire blank may be pressed and shaped by means of and in the molds in which the vulcanizing takes place; and a further object is to provide a simple form of apparatus to effect the simultaneous expansion and lateral compression of the cylindrical tire blank. A further object is to provide means and a process whereby, if desired, a reinforcing inner lining may be applied during the process of expanding, shaping and vulcanizing, and to insure that the tire shall be held under internal air pressure during the vulcanizing process.

All of the foregoing objects are obtained by the apparatus and method which will now be described and which it will be observed reduces to a minimum the manual operations required.

The present invention therefore consists of an apparatus embodying shaping and vulcanizing molds, means to expand a cylindrical tire blank within said molds, means for forcing the molds toward each other while the expansion takes place, and means for securing the molds about the expanded and shaped tire during the vulcanizing operation; and it further consists, of an expanding drum comprising a rubber cylindrical wall which may or may not be united to the inner surface of the tire during the vulcanizing process; and it further consists of the devices and combinations of devices and of the process of manufacturing tires which will be hereinafter described and claimed.

The invention is shown in the accompanying drawings, in which—

Figure 1 shows a vertical section of an embodiment of my invention, with the tire blank in position and the mold sections separated;

Fig. 2 is a similar view showing the mold sections in juxtaposition;

Fig. 3 is a plan view of the invention partly broken away and partly in section;

Fig. 4 is a fragmentary end elevation showing certain details of construction;

Fig. 5 is a similar view to Fig. 4, showing the parts in different positions;

Fig. 6 is a fragmentary, sectional perspective showing the formed tire;

Fig. 7 is a view similar to Fig. 6, showing the tire having the sectional inner wall applied thereto;

Fig. 8 is an enlarged, vertical section on the line 8—8 of Fig. 3; and

Fig. 9 is a fragmentary, enlarged section of the expanding drum.

Similar reference characters will be employed in designating corresponding parts.

In the drawings, 1 indicates the cylindrical tire blank as produced by the instrumentalities and processes described in my beforementioned pending applications. The tire blank 1 is provided with bead formations 2, and with the annularly centrally disposed thickened tread 3. In order to produce a tire from such a blank it must be expanded centrally and annularly, and simultaneously with such expansions the beaded edges 2 must be pressed toward each other, after which it must be properly vulcanized.

In my prior, pending applications the expanding and shaping of the tire blank is performed by one set of instrumentalities, and after it has been held under pressure sufficient length of time to insure its holding its shape, it is fitted between suitable molds and vulcanized. This involves considerable handling and manipulation, incident to the removal of the tire from the press in which it has been expanded and shaped and the fitting of the vulcanizing molds thereto, and of course it involves the removal from the press in which it was expanded and shaped to the vulcanizing apparatus.

In the present invention I reduce to a minimum the manual handling of the tire and shape and press it in the molds in which it is subsequently vulcanized, no core being employed during the vulcanizing process, the tire being held in close contact with the inner surfaces of the molds by the air employed in expanding the tire blank.

The tire shaping and vulcanizing molds 4 are formed in pairs, and preferably they are cast iron as usual in such devices. They are formed in two circular complementary parts, each of which is provided upon its inner face with the required shaping surface 5. The mold sections 4 are provided externally with the flanges 6, which at intervals are provided with notches 7 for a purpose which will be hereinafter described.

Coöperating with the mold sections 4 there is employed expanding means 8, which comprises the disks 9 formed of metal or other material suitable for the purpose. These disks 9 are connected by an expanding wall 10. The wall 10 is formed preferably of rubber and is an endless cylinder in form, and of sufficient width so that when connected to the disks 9 and the disks moved away from each other to that extent permitted by the width of the wall 10, there will be an air chamber formed between the disks 9 and within the wall 10, containing preferably sufficient air to expand the wall 10 and the tire blank 1 within the molds 4. The wall 10 will preferably have its edges reënforced by strips of fabric as indicated at 11. The edges of the wall 10 will preferably be perforated at intervals as shown at 12, so that the perforations may be engaged with the threaded studs 13 projecting from the outer surfaces of the disks 9, near the edges of the disks. The perforations 12 have cut extensions 12ª of sufficient length to permit the nuts 16 of the threaded studs 13 to be forced through the perforations without removing the nuts.

In order to make an airtight connection between the wall 10 and the disks 9, there are provided clamping rings 14, which are provided with apertures as at 15, to pass over the threaded studs 13, and each of the studs 13 is provided with a nut 16, whereby the clamping rings 14 may be forced tightly against the edges 11 of the wall 10, clamping the same between the rings and the edges of the disks 9, forming an airtight connection and an airtight drum with a flexible wall.

In order that the clamping rings 14 may be removed quickly when desired, to provide a new wall 10, the openings 15 in the rings 14 will preferably be formed of keyhole shape as shown. By so forming them it will not be necessary to remove the nuts 16 from the studs 13 in order to remove the rings, as by loosening the nuts 16 the rings may be turned slightly to bring the larger portion of the keyhole openings in register with the nuts, thus permitting the rings to be quickly removed and applied.

In operation, one of the mold sections 4 is suitably supported near a press. Thus supporting the cylinder tire blank 1 is placed in position relative to this mold section 4, and the drum, comprising the disks 9 and the wall 10, is positioned within the cylinder tire blank. To hold the mold section 4 temporarily spaced apart, spacing bars 17 are provided, such bars having at their ends a projecting tongue 18 and shoulders 19, the tongues 18 fitting in the notches 7 of the flanges 6 of the mold sections, and the shoulders 19 abutting against the inner opposed surfaces of such flanges. Suitable means are provided, as for instance, a press, for forcing the disks 9 toward each other, thus compressing the air inclosed between said disks 9 and within the wall 10, expanding the wall 10, which engages the inner surface of the cylindrical tire blank 1.

As stated, to force the disks 9 toward each other, all the parts, assembled as above described, are placed under a suitable press, the spacing bars 17 are then removed, and as the bed of the press moves toward the crosshead, the mold sections 4 will be forced toward each other and simultaneously therewith the disks 9 are forced toward each other. This operation causes the wall 10 to expand the tire blank 1 annularly, while the molds 4 will force the edges of the tire blank toward each other, and this operation continues until the disks 9 come closely together and the mold sections 4 are brought into closed relation, shaping the outer surface of the tire blank and causing it to assume that form in cross section which is desired in the finished tire. At this point in the operation locking bars 20, each comprising a rod 21 and heads 22, are inserted in the notches 7 of the flanges 6 of the mold section, thus holding the sections of the mold about the inflated tire retaining the air therein.

It is contemplated that the parts will be so proportioned that sufficient air will be contained between the disks 9 and within the wall 10 when the disks are apart, properly to expand and shape the tire blank and to hold it against the shaping surfaces of the molds during the vulcanizing process, so that it will be unnecessary to supply additional air.

Should it be found desirable, additional air may be pumped into the drum, and for that purpose one of the disks 9 will be provided with a suitable air inlet 23 receiving air through a pipe 24 from any suitable source of supply. If so desired, a release valve 24ᵃ may be provided adjacent to the air inlet 23 of the disk 9 having an outlet opening which will permit decreasing of the air pressure formed by the compression of the disks 9 and the wall 10, should such decrease of pressure be desirable or necessary.

After the parts have been brought to that position shown in Fig. 2 and the mold sections properly locked, the tire is then vulcanized and cured, and this operation may be performed in the press in which the tire has been shaped, or the molds, tire and drum may be removed to the vulcanizing press. In any event it will be observed that as the vulcanizing takes place in the molds within which the tire has been expanded, pressed and shaped, it will not be necessary to relieve the pressure after it has been once supplied, nor to remove the tire and place it within other vulcanizing molds.

If it is deemed advisable, that section of the wall 10 which projects beyond the disks 9 and the clamping rings 14 may be provided with a rubber adhesive upon its outer surface, before it is expanded within the tire blank, and after the vulcanizing operation has been completed that portion of the wall 10 which has been so treated will become an integral part of the tire, forming a reinforcing inner wall, and when this is done the edges clamped between the disks 9 and the rings 14 will be cut off leaving that portion of the wall 10 which has been attached to the inner surface of the tire as a part thereof.

It will be observed that the line of severance will leave a portion of the reinforcement of the edges 11 to become a part of the bead of the tire.

While my invention contemplates the use of a portion of the wall 10 as thus described, it is of course to be understood that it is not limited thereto, as the wall 10 may be used simply as an expanding medium and used over and over again until it is worn out.

If the wall 10 is not used as a reinforcing lining it may be formed of any impervious material suitable for the purpose which will be least affected by the heat used in vulcanizing.

Having thus described my invention, I claim as new and desire to secure by Letters Patent:—

1. In an apparatus for manufacturing pneumatic tires, an expanding device comprising opposed heads and an elastic wall hermetically connected thereto, the heads being freely movable toward and from each other, and means for admitting and confining a fluid charge within said expanding device, said fluid charge filling the chamber while the heads are moved away from each other and of sufficient volume to expand the elastic wall when the heads are moved toward each other.

2. In an apparatus for manufacturing pneumatic tires, in combination, an expanding element comprising opposed circular heads, an elastic wall hermetically connected to said heads, mold sections within which the tire may be expanded, and means to compress the heads to expand the tire within the mold sections.

3. An apparatus for manufacturing pneumatic tires, comprising in combination, a pair of shaping and pressing mold sections, inflatable means to expand a cylindrical tire blank annularly within and between the mold sections while said mold sections are moved toward each other.

4. An apparatus for manufacturing pneumatic tires, comprising in combination, a pair of shaping and pressing mold sections, inflatable means to expand a cylindrical tire blank annularly within and between the mold sections while the mold sections are moved toward each other, and means to lock the mold sections about the expanded tire.

5. An apparatus for manufacturing pneumatic tires, comprising, in combination, a pair of complementary mold sections, means to support the mold sections spaced from each other, for inserting the tire blank and expanding means, inflatable means for expanding annularly a cylindrical tire blank within and between the mold sections, and locking devices to lock the mold sections about the expanded tire.

6. An apparatus for manufacturing pneumatic tires, comprising in combination, a pair of shaping molds for holding a tire while expanded during the vulcanizing process, and a drum having an elastic wall for expanding by fluid pressure the tire between the mold sections as the mold sections are moved to inclose the expanding tire.

7. An apparatus for manufacturing pneumatic tires, comprising, in combination, a pair of shaping and vulcanizing tire molds for operating on cylindrical tire blanks, a drum comprising opposed rigid heads movable toward and from each other, and an elastic wall connected to said heads.

8. An apparatus for manufacturing pneumatic tires, comprising, in combination, tire shaping and vulcanizing molds, means for expanding and inflating a cylindrical tire blank within said molds, comprising a pair of circular rigid heads movable toward and from each other, and a flexible wall connected to the edges of said heads, said wall being made of rubber.

9. An apparatus for manufacturing pneumatic tires, comprising, in combination, tire shaping and vulcanizing molds, and means for expanding and inflating a cylindrical tire blank comprising a pair of circular rigid heads movable toward and from each other, and a flexible wall connected to the edges of said heads, said walls being made of rubber and having reinforced and thickened edges.

10. An apparatus for manufacturing pneumatic tires, comprising, in combination, tire shaping and vulcanizing molds, and means for expanding a cylindrical tire blank within said molds, comprising a pair of rigid heads and a rubber wall, and means for producing an air tight joint between said heads and said rubber wall.

11. An apparatus for manufacturing pneumatic tires, comprising, in combination, tire shaping and vulcanizing molds, means for expanding a cylindrical tire blank within said molds, comprising a pair of rigid heads and a rubber wall, and a removable clamping means for producing an air tight joint between said heads and said rubber wall.

12. An apparatus for manufacturing pneumatic tires, comprising, in combination, shaping and vulcanizing tire molds, means for expanding and inflating a cylindrical tire blank between said molds, said means comprising a pair of heads and a cylindrical wall of rubber, and means to supply fluid pressure between said heads and within the wall.

13. An apparatus for manufacturing pneumatic tires, comprising, in combination, a pair of mold sections initially spaced apart, means carried by said mold sections for receiving the edges of and supporting a cylindrical tire blank, and means for simultaneously expanding a cylindrical tire blank into position between said mold sections and for moving said molds sections toward each other.

14. An apparatus for manufacturing pneumatic tires, comprising, in combination, a pair of shaping and pressing mold sections initially spaced apart, means carried by said mold sections for receiving the edges of and supporting a cylindrical tire blank, means for simultaneously expanding said cylindrical tire blank into position between said mold sections and for moving said mold sections toward each other, means for holding said mold sections spaced apart, and means for holding said mold sections together when they are closed about the expanded tire.

15. An apparatus for manufacturing pneumatic tires, comprising, in combination, a pair of shaping and pressing mold sections, means for holding said sections initially spaced apart, a pair of annular members disposed within said mold sections, a flexible connection between said members, said flexible connection serving to expand the cylindrical tire blank into position between said mold sections when said members are moved toward each other, and means for holding said mold sections together when they are in juxtaposition.

16. The process of manufacturing tires, which consists in expanding a cylindrical tire blank between vulcanizing and shaping molds and simultaneously pressing the edges of said blank toward each other and thereafter vulcanizing the tire blank while held within the molds.

17. The process of manufacturing tires, which consists in inflating a cylindrical tire blank between a pair of vulcanizing and shaping molds, and thereafter vulcanizing the tire blank while held under pressure within said molds in an inflated condition.

18. The process of manufacturing tires, which consists in inflating a cylindrical tire blank between shaping and vulcanizing molds and simultaneously applying a reinforcing lining within said tire during the vulcanizing process.

19. The process of manufacturing tires, from a cylindrical tire blank which consists in expanding and inflating the tire blank annularly by means of an elastic expanding drum, uniting the flexible portion of said drum to the inner surface of the tire during the vulcanizing process, and subsequently severing the inflatable portion of the drum from the remainder thereof.

BARTHOLD DE MATTIA.